(12) United States Patent
Takagi et al.

(10) Patent No.: US 7,392,598 B2
(45) Date of Patent: Jul. 1, 2008

(54) METHOD AND DEVICE FOR MEASURING DIMENSION OF CONSTANT VELOCITY JOINT

(75) Inventors: Takeshi Takagi, Utsunomiya (JP); Minoru Koyama, Mooka (JP); Mitsuyoshi Nakatani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 11/629,464

(22) PCT Filed: Jun. 14, 2005

(86) PCT No.: PCT/JP2005/010859

§ 371 (c)(1),
(2), (4) Date: Dec. 14, 2006

(87) PCT Pub. No.: WO2006/001193

PCT Pub. Date: Jan. 5, 2006

(65) Prior Publication Data

US 2007/0227238 A1    Oct. 4, 2007

(30) Foreign Application Priority Data

Jun. 24, 2004  (JP)  ............................. 2004-187021
Jun. 24, 2004  (JP)  ............................. 2004-187022

(51) Int. Cl.
*G01B 5/14* (2006.01)
(52) U.S. Cl. .......................................... 33/833; 33/600
(58) Field of Classification Search .................. 33/600, 33/710, 783, 833, 836
See application file for complete search history.

(56) References Cited

U.S. PATENT DOCUMENTS

| 3,438,135 | A | * | 4/1969 | Bense ........................... 33/600 |
| 3,465,449 | A | * | 9/1969 | Wideburg et al. ............. 33/600 |
| 5,033,292 | A | * | 7/1991 | Dennis .......................... 33/335 |
| 5,930,908 | A | * | 8/1999 | Patrisso et al. ................ 33/600 |
| 2004/0083830 | A1 | * | 5/2004 | Nashiki et al. ............ 73/865.9 |

FOREIGN PATENT DOCUMENTS

| JP | 56-97701 U | 8/1981 |
| JP | 56-169202 U | 12/1981 |
| JP | 57-68505 U | 4/1982 |
| JP | 58-6205 U | 1/1983 |
| JP | 5-30706 U | 4/1993 |
| JP | 6-249622 A | 9/1994 |
| JP | 9-210605 A | 8/1997 |

* cited by examiner

*Primary Examiner*—G. Bradley Bennett
(74) *Attorney, Agent, or Firm*—Birch, Stewart, Kolasch & Birch, LLP

(57) ABSTRACT

A method and a device for measuring the dimensions of a constant velocity joint. In the method, for example, the cylindrical part of an outer member with a specified offset value is supported on the support part of a dimension measuring device for the outer member. On the other hand, a holding bar is inserted into a recessed part formed in the shaft part of the outer member. In this case, balls installed at the tip of the support part are inserted into the ball grooves of the cylindrical part. In this state, a rotating member is rotated to bring a probe into contact with the inside wall of the cylindrical part. The measurement core of a micro gauge is displaced according to the displacement of the probe, and the amount of the displacement thereof is displayed as the amount of the variation of the needle of the micro gauge.

8 Claims, 9 Drawing Sheets

METHOD AND DEVICE FOR MEASURING DIMENSION OF CONSTANT VELOCITY JOINT

TECHNICAL FIELD

The present invention relates to a method of and an apparatus for measuring a dimension of a constant velocity universal joint, i.e., the distance (offset) from the center of a spherical inner surface of an outer member and an inner member of the constant velocity universal joint to the center of ball grooves thereof.

BACKGROUND ART

FIG. 8 is a schematic cross-sectional view of a Barfield-type constant velocity universal joint (hereinafter referred to as "constant velocity universal joint") 10 which has heretofore been known. The constant velocity universal joint 10 has an outer member 12, an inner member 14, and rolling balls 16 interposed between the outer member 12 and the inner member 14.

The outer member 12 has a shank 18 and an open tubular member 20. The tubular member 20 has six angularly equally spaced ball grooves 22a through 22f defined in a curved inner wall surface thereof.

The inner member 14 is held by a retainer 24 and inserted in the tubular member 20. As shown in FIG. 9, the inner member 14 has as many inner ball grooves 26a through 26f as the number of the ball grooves 22a through 22f in the outer member 12, the inner ball grooves 26a through 26f being defined in a curved outer circumferential surface of the inner member 14 which projects radially outwardly. The inner member 14 also has a through hole 27 defined therein which extends from one end to the other end thereof. A drive shaft DS is fitted in the through hole 27.

The retainer 24 has windows 28 defined therein which extend from an inner wall surface to an outer wall surface thereof. The rolling balls 16 are accommodated respectively in the windows 28 and are inserted in the ball grooves 22a through 22f in the outer member 12 and the inner ball grooves 26a through 26f in the inner member 14.

If the central line L of the constant velocity universal joint 10 and a line drawn from the center of one of the balls 16 toward the central line L vertically cross each other at a point C, then it is ideal that the point A at the center of curvature (r) of the inner ball grooves 26a through 26f and the point B at the center of curvature (R) of the ball grooves 22a through 22f are spaced from the point C respectively, by equal distances, i.e., AC=BC is satisfied, or in other words, the point A and the point B are offset from the point C respectively, by equal distances. The point A is referred to as the center of a spherical inner surface, and the point C as the center of ball grooves.

The dimensions of inner members 14 that are successively produced by forging are not necessarily identical to each other, but tend to vary from reference values. Stated otherwise, AC=BC may not necessarily be satisfied.

Therefore, it is customary, for example, to measure the distances from an end surface of the inner member 14 (a surface facing a closed end surface in the tubular member 20 of the outer member 12) to the point A and the point B, and select the inner member 14 as a proper inner member if the measured distances fall within preset allowable ranges and select the inner member 14 as an improper inner member if the measured distances fall outside of the preset allowable ranges. Patent documents 1, 2 propose dimension measuring apparatus for use in such measurements.

The selecting process is also carried out in processes subsequent to the forging process, e.g., in a heating process and when a machining process such as a cutting process is finished.

A plurality of outer members 12 are also successively produced by forging. Consequently, as with the inner members 14, the dimensions of the outer members 12 are not necessarily identical to each other, but somewhat vary from reference values. It is also customary, after the forging process, the heating process, and the cutting process, etc. are finished, to measure the distances a, b from the closed end surface in the tubular member 20 to the point B and the point C, as shown in FIG. 8, subtract the distance a from the distance b to calculate an offset, and select the outer member 12 as a proper outer member if the offset falls in a preset allowable range and select the outer member 12 as an improper outer member if the offset falls outside of the preset allowable range.

Known apparatus for measuring the dimensions of outer members are described in Patent documents 3, 4 in addition to Patent document 1.

Patent document 1: Japanese Laid-Open Utility Model Publication No. 57-68505;
Patent document 2: Japanese Laid-Open Utility Model Publication No. 56-97701;
Patent document 3: Japanese Laid-Open Utility Model Publication No. 58-6205; and
Patent document 4: Japanese Laid-Open Utility Model Publication No. 56-169202.

DISCLOSURE OF THE INVENTION

With the apparatus for measuring the dimensions of outer members as described in Patent documents 1, 2, however, it is necessary to perform an operation to measure the distance up to the point A and an operation to measure the distance up to the point B. That is, two dimensional measurements have to be made. The apparatus for measuring the dimensions of outer members as described in Patent documents 1, 3, 4 are also required to perform an operation to measure the distance a and an operation to measure the distance b.

Therefore, the conventional dimension measuring apparatus have to make two dimensional measurements. Performing such operations is a complex task and does not lead to efficient measurements.

It is a general object of the present invention to provide a method of measuring a dimension of a constant velocity universal joint to easily and efficiently determine an offset of an outer member or an inner member.

A major object of the present invention is to provide an apparatus for measuring a dimension of a constant velocity universal joint to determine an offset of an outer member or an inner member through a simple process.

According to an embodiment of the present invention, there is provided a method of measuring a dimension of a constant velocity universal joint to measure the distance from the center of a spherical inner surface of an outer member of the constant velocity universal joint to the center of ball grooves thereof, comprising the steps of:

supporting an outer member as a measurement reference whose distance from the center of the spherical inner surface to the center of the ball grooves has been measured in advance, and inserting balls into some of the ball grooves defined in an inner wall surface of an open tubular member of said outer member;

causing a measuring probe disposed between the balls to project into abutment against the inner wall surface of said tubular member, and using the amount of displacement of said measuring probe until said measuring probe abuts against the inner wall surface of said tubular member, as a reference amount of displacement;

supporting an outer member to be measured and inserting the balls into some of the ball grooves defined in the inner wall surface of the tubular member of said outer member;

causing said measuring probe to project into abutment against the inner wall surface of said tubular member; and calculating the difference between the amount of displacement of said measuring probe until said measuring probe abuts against the inner wall surface of said tubular member and said reference amount of displacement.

According to the present invention, specifically, an outer member whose offset is of a predetermined value is used as a measurement reference, and a dimension of the reference outer member and a dimension of an outer member to be measured are compared with each other. Therefore, the offset of the outer member to be measured can easily be determined by a single simple dimension measuring process.

According to the present invention, therefore, the offset of the outer member can quickly be measured, and hence the measuring efficiency can be increased.

In the measuring method, if the difference between the amount of displacement of said measuring probe and said reference amount of displacement falls within a preset range, it may be judged that said outer member has a level of dimensional accuracy in an allowable range.

According to another embodiment of the present invention, there is also provided an apparatus for measuring a dimension of a constant velocity universal joint to measure the distance from the center of a spherical inner surface of an outer member of the constant velocity universal joint to the center of ball grooves thereof, comprising:

a base;

a support vertically mounted on said base and supporting an open tubular member of said outer member;

a holder disposed above said support and holding a shank of said outer member;

a plurality of balls positioned on and fixed to a distal end of said support and inserted individually into a plurality of ball grooves defined in an inner wall surface of said tubular member, the number of said balls being smaller than the number of said ball grooves;

a measuring probe disposed between said balls and movable into and out of abutment against the inner wall surface of said tubular member;

a displacing mechanism for moving said measuring probe into and out of abutment against the inner wall surface of said tubular member; and a displacement indicator for indicating the amount of displacement of said measuring probe until said measuring probe is brought into abutment against the inner wall surface of said tubular member.

With the above arrangement, the amount of displacement of the measuring probe which corresponds to the offset can easily and simply be measured.

For moving the measuring probe toward or away from the inner wall surface of the tubular member in the dimension measuring apparatus of the above type, the measuring probe may be disposed on the turning member, for example, and the measuring probe may be displaced as the turning member is turned. Specifically, said measuring probe may be moved toward the inner wall surface of said tubular member when a turning member having an end to which said measuring probe is fixed is turned by a presser which presses the other end of said turning member, and said measuring probe may be moved away from the inner wall surface of said tubular member when the other end of said turning member is freed from a pressing force of said presser.

According to still another embodiment of the present invention, there is also provided a method of measuring a dimension of a constant velocity universal joint, which has an outer member and an inner member mounted therein, to measure the distance from the center of a spherical inner surface of the inner member to the center of inner ball grooves thereof, comprising the steps of:

supporting an inner member as a measurement reference whose distance from the center of the spherical inner surface to the center of the inner ball grooves has been measured in advance, and inserting balls into some of inner ball grooves defined in the inner member;

causing a measuring probe disposed between the balls to project into abutment against an outer circumferential surface of said inner member between said inner ball grooves, and using the amount of displacement of said measuring probe until said measuring probe abuts against said outer circumferential surface, as a reference amount of displacement;

supporting an inner member to be measured and inserting the balls into some of the ball grooves defined in said inner member;

displacing said measuring probe into abutment against said outer circumferential surface; and calculating the difference between the amount of displacement of said measuring probe until said measuring probe abuts against said outer circumferential surface and said reference amount of displacement.

According to the present invention, specifically, an inner member whose offset is of a predetermined value is used as a measurement reference, and a dimension of the reference inner member and a dimension of an inner member to be measured are compared with each other. Therefore, the offset of the inner member to be measured can easily be determined by a single simple dimension measuring process.

According to the present invention, therefore, the offset of the inner member can quickly be measured, and hence the measuring efficiency can be increased.

In the measuring method, if the difference between the amount of displacement of said measuring probe and said reference amount of displacement falls within a preset range, it may be judged that said inner member has a level of dimensional accuracy in an allowable range.

According to yet another embodiment of the present invention, there is further provided an apparatus for measuring a dimension of a constant velocity universal joint to measure the distance from the center of a spherical inner surface of an inner member of the constant velocity universal joint to the center of inner ball grooves thereof, comprising:

a mount;

a housing mounted on said mount and housing said inner member;

a holder mechanism disposed above said housing and having a holder rod including a portion to extend through a through hole in said inner member;

a plurality of balls disposed in said housing and inserted individually into a plurality of inner ball grooves defined in said inner member;

a measuring probe disposed between said balls and movable into and out of abutment against an outer circumferential surface of said inner member;

a displacing mechanism for moving said measuring probe into and out of abutment against the outer circumferential surface of said inner member; and a displacement indicator for indicating the amount of displacement of said measuring probe until said measuring probe is brought into abutment against the outer circumferential surface of said inner member.

With the above arrangement, the amount of displacement of the measuring probe which corresponds to the offset can easily and simply be measured.

For moving the measuring probe toward or away from the outer circumferential surface of the inner member in the dimension measuring apparatus of the above type, the measuring probe may be disposed on the turning member, for example, and the measuring probe may be displaced as the turning member is turned. Specifically, said measuring probe may be moved away from said outer circumferential surface when a turning member having an end to which said measuring probe is fixed is turned by a presser which presses the other end of said turning member, and said measuring probe may be moved toward said outer circumferential surface when the other end of said turning member is freed from a pressing force of said presser.

Either one of the dimension measuring apparatus is capable of easily determining an offset according to a single simple dimension measuring process. Therefore, the time required to measure a dimension can be reduced, and the measuring efficiency can be increased.

BEST MODE FOR CARRYING OUT THE INVENTION

Preferred embodiments of a method of measuring a dimension of a constant velocity universal joint according to the present invention in relation to an apparatus for carrying out the method will be described in detail below with reference to the accompanying drawings.

Figure 1:
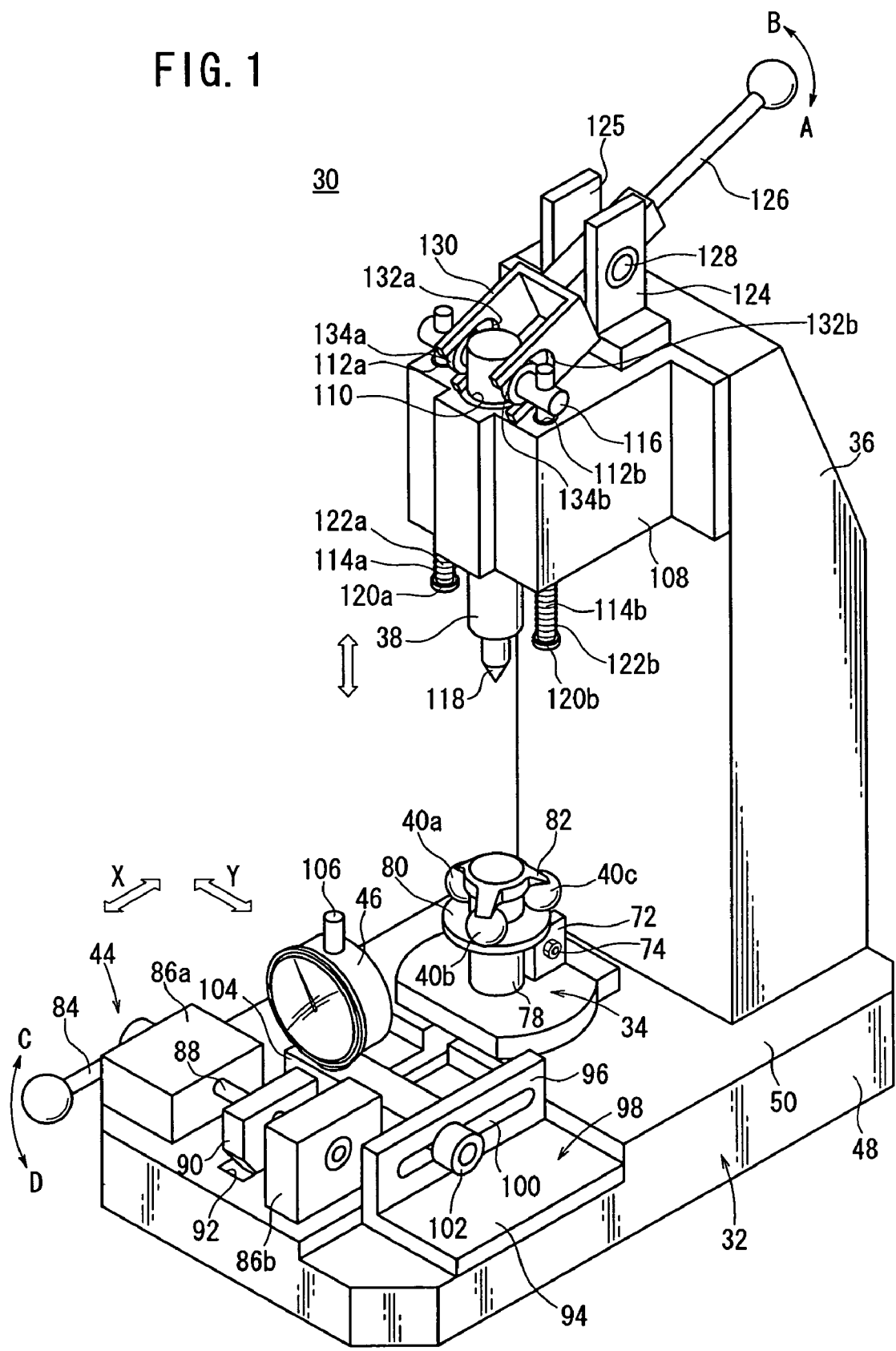
FIG. 1 is a schematic perspective view of an apparatus for measuring a dimension of a constant velocity universal joint according to a first embodiment.
Figure 2:
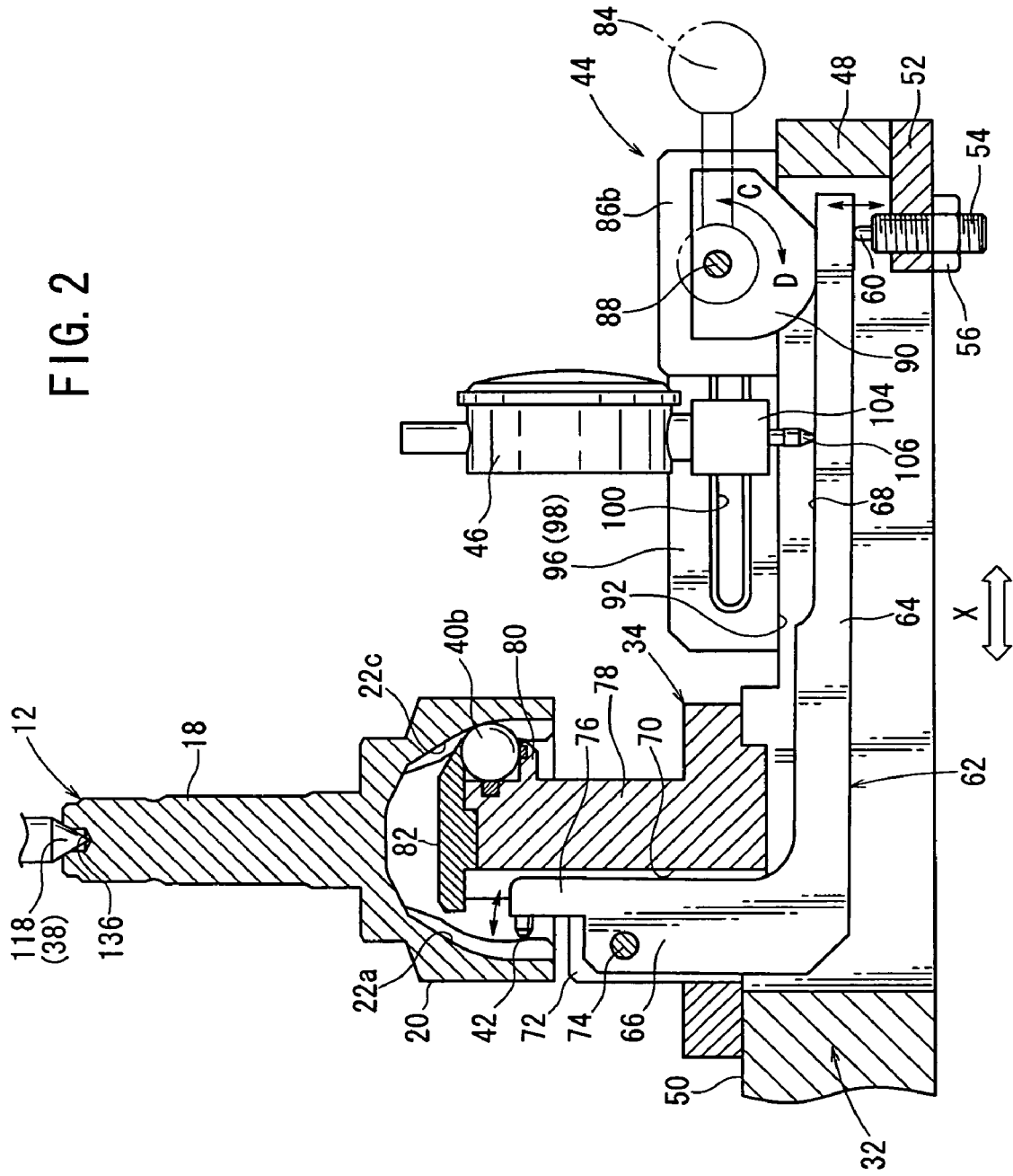
FIG. 2 is a fragmentary vertical cross-sectional view of the apparatus for measuring a dimension of a constant velocity universal joint shown in FIG. 1.

FIG. 1 shows in schematic perspective an apparatus for measuring a dimension of a constant velocity universal joint (hereinafter referred to as "outer member dimension measuring apparatus") according to a first embodiment of the present invention, and FIG. 2 shows the apparatus in fragmentary vertical cross section. The outer member dimension measuring apparatus 30 has a base 32, a support 34 which is vertically disposed on the base 32, a holder rod 38 disposed as a holder above the support 34 by a post 36, three balls 40a through 40c positioned on and fixed to a distal end of the support 34, a measuring probe 42 (see FIG. 2) disposed between the balls 40a, 40c, a displacing mechanism 44 for turning the measuring probe 42, and a microgage 46 serving as a displacement indicator for indicating an amount of displacement of the measuring probe 42.

As shown in FIG. 2, the base 32 comprises a hollow body having a side plate 48 and a top plate 50. A projecting plate 52 extending toward the center of the base 32 is coupled to the side plate 48. In FIG. 2, the outer member 12 is shown as being supported on the support 34.

A screw 54 is screwed through the projecting plate 52. The screw 54 is prevented by a nut 56 from being unpegged from the projecting plate 52. The screw 54 houses therein a helical spring, not shown, and a presser pin 60 normally biased resiliently by the helical spring to project upwardly in FIG. 2 from the screw 54.

The presser pin 60 has a tip end, which is held against a turning member 62. The turning member 62 has an elongate horizontal arm 64 extending in the direction X in FIGS. 1 and 2 and a vertical arm 66 extending vertically upwardly from an end of the horizontal arm 64. The horizontal arm 64 has a step 68 provided by a slight recess defined in an upper end thereof. The vertical arm 66 is inserted in a recess 70 defined in the support 34 and is angularly movably supported by a screw 74 on a pivotal support 72 disposed near the support 34.

A measuring probe connector 76 projects from the distal end of the vertical arm 66. The measuring probe 42 is disposed on the measuring probe connector 76 in facing relation to the post 36 (see FIG. 2).

As described above, the three balls 40a through 40c are disposed on the distal end of the support 34. Specifically, the support 34 has a rod-shaped member 78 vertically mounted on the top plate 50 of the base 32, a larger-diameter member 80 mounted on the rod-shaped member 78, and a flange 82 fitted in the distal end surface of the rod-shaped member 78. The balls 40a through 40c are sandwiched between the larger-diameter member 80 and the flange 82.

The displacing mechanism 44 has a lever 84 positioned at a corner of the base 32 (see FIG. 1). A bar 88 is coupled to the lever 84 and angularly movably supported by bearings 86a, 86b mounted on the base 32. A rotary presser 90 is positioned on and fixed to a substantially central portion of the bar 88. As can be understood from FIGS. 1 and 2, the top plate 50 of the base 32 has an elongate slot 92 defined therein which extends along the direction indicated by the arrow X. The rotary presser 90 has a curved pressing surface, which presses the step 68 when brought into pressing engagement with the end of the step 68 of the turning member 62 through the slot 92.

An L-shaped stay 98 of a substantially L-shaped cross section having a bottom wall 94 and a vertical wall 96 is disposed on the base 32. The vertical wall 96 of the L-shaped stay 98 has an oblong hole 100 defined therein which extends along the direction indicated by the arrow X.

A bolt 102 which extends through the oblong hole 100 is screwed into a microgage stay 104 in the form of a rectangular parallelepiped. The microgage stay 104 is thus positioned and fixed so as to extend in a direction (the direction indicated by the arrow Y) that is perpendicular to the longitudinal direction (the direction indicated by the arrow Y) of the slot 92.

The microgage 46 has a measuring core 106 which is threaded through the microgage stay 104. The tip end of the measuring core 106 which projects from the lower end surface of the microgage stay 104 extends through the slot 92 and is held against the step 68 of the turning member 62 (see FIG. 2).

The microgage 46 has a rotatable dial. Therefore, the marking "0" (origin) on the dial can be set to a desired position.

A joint 108 is connected to the side surface of the post 36 which faces the support 34. The holder rod 38 is disposed above the support 34 by the joint 108. The joint 108 has a large through hole 110 and two small through holes 112a, 112b which are juxtaposed to each other in sandwiching relationship to the large through hole 110. The holder rod 38 extends through the large through hole 110, so that the holder rod 38 is positioned above the support 34. Return rods 114a, 114b extend respectively through the small through holes 112a, 112b. The holder rod 38 and the return rods 114a, 114b are joined to each other by a joint bar 116. extending through and over their heads.

The holder rod 38 has a conical point 118 on a lower end thereof.

The return rods 114a, 114b have respective large-diameter disks 120a, 120b on their lower ends, and helical springs 122a, 122b have respective ends seated on the large-diameter disks 120a, 120b. The other ends of the helical springs 122a, 122b are seated on a lower end surface of the joint 108 for normally biasing the return rods 114a, 114b resiliently toward the support 34.

A handle lever support 124 is connected to an upper portion of the joint 108. A handle lever 126 which is inserted through an insertion slot 125 in the handle lever support 124 is angularly movably supported by a pivot shaft 128. A grip member 130 having a substantially C-shaped cross section is mounted on a distal end of the handle lever 126. The grip member 130 has U-shaped grooves 132a, 132b defined in a distal end thereof. The joint bar 116 is fitted in the U-shaped grooves 132a, 132b with spacers 134a, 134b interposed therebetween.

The outer member dimension measuring apparatus 30 according to the first embodiment is basically constructed as described above. Operation and advantages of the outer member dimension measuring apparatus 30 will be described below in relation to a dimension measuring method.

An outer member 12 of a Barfield-type constant velocity universal joint 10 whose offset is of a predetermined value is prepared, and used as a measurement reference (the outer member will hereinafter referred to as "reference outer member").

Figure 8:
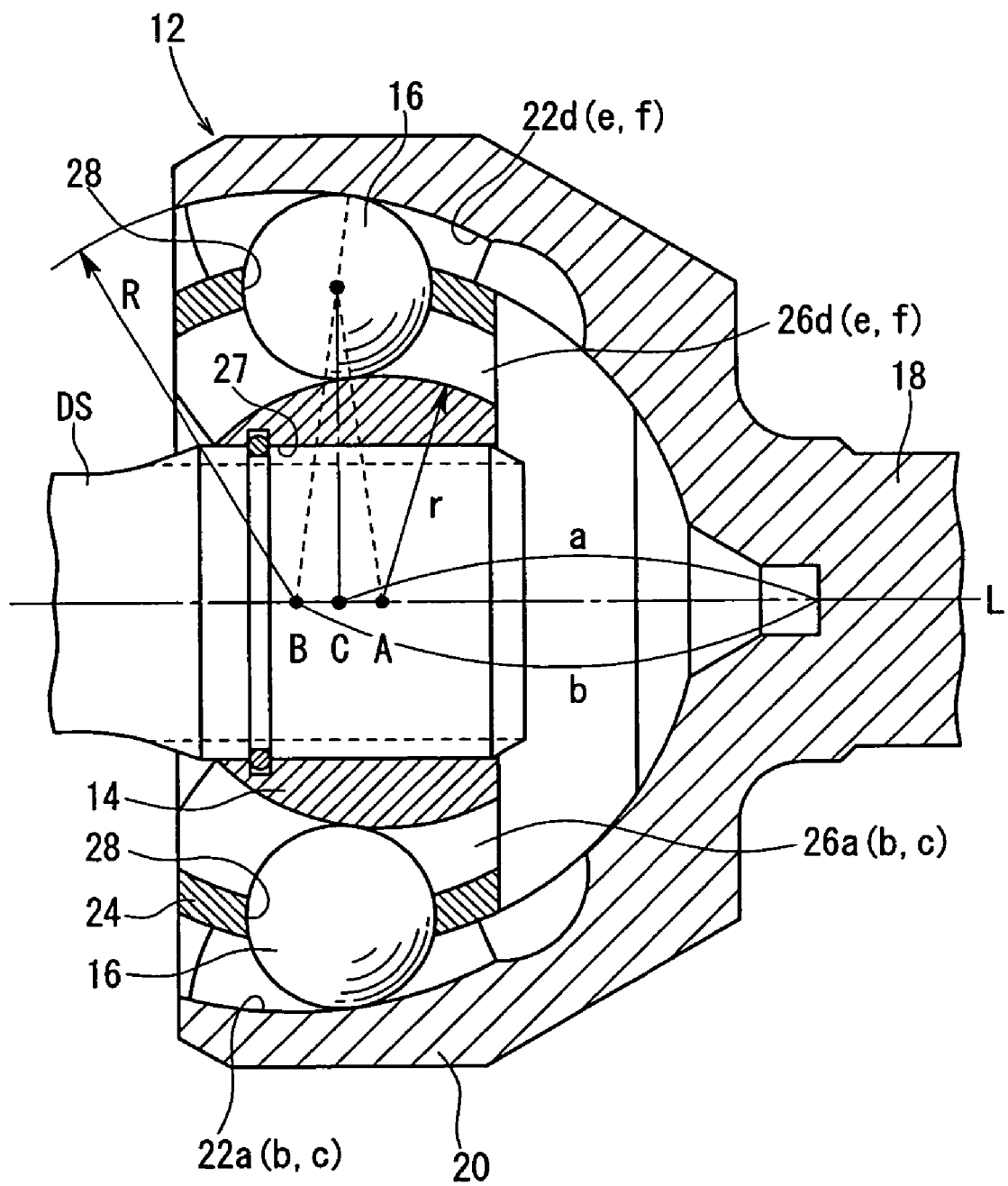
FIG. 8 is a schematic cross-sectional view of a Barfield-type constant velocity universal joint.
Figure 9:
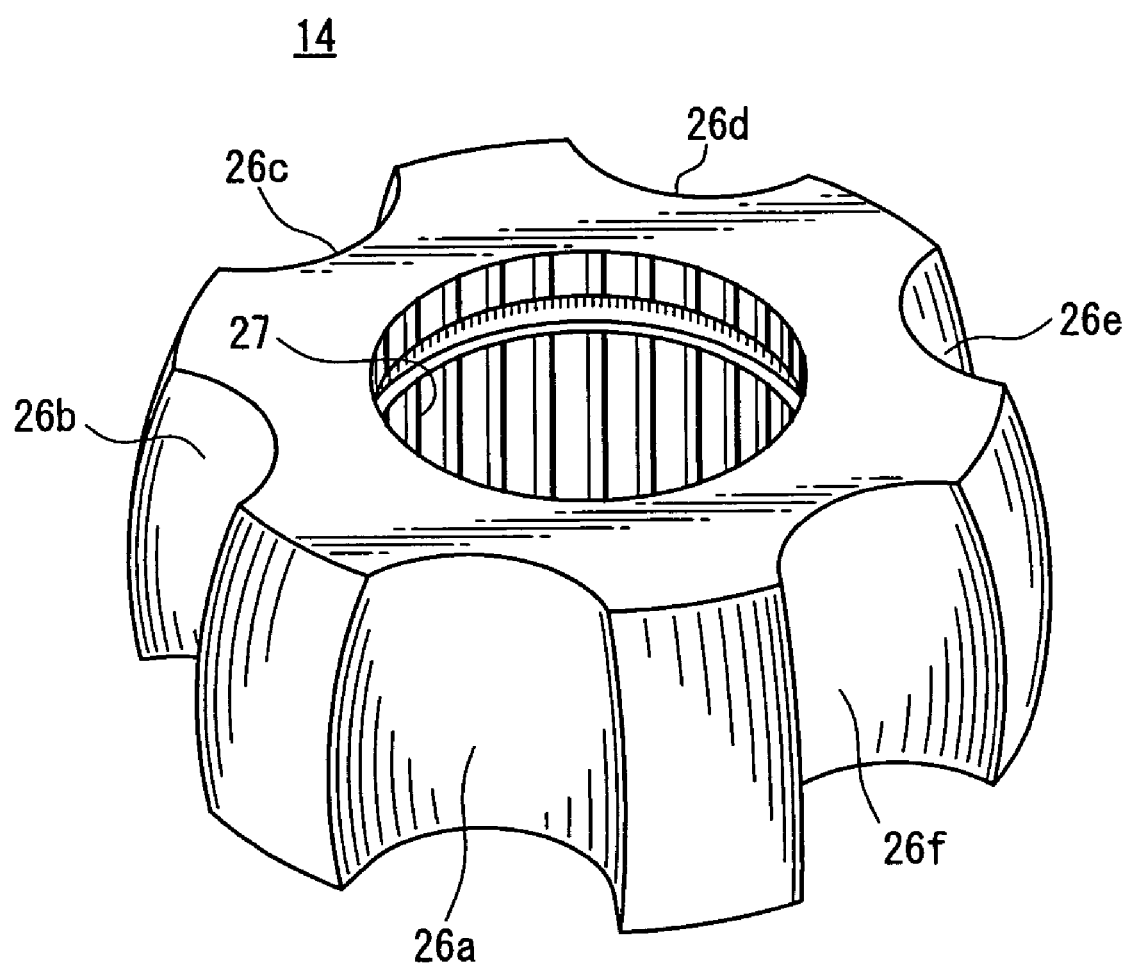
FIG. 9 is a perspective view of an inner member of the Barfield-type constant velocity universal joint shown in FIG. 8.

As shown in FIG. 8, the outer member 12 has a shank 18 and an open tubular member 20. The tubular member 20 has six angularly equally spaced ball grooves 22a through 22f defined in a curved inner wall surface thereof. For installing the outer member 12 on the outer member dimension measuring apparatus 30, the lever 84 is held in a two-dot-and-dash-line position shown in FIG. 3, and the handle lever 126 is turned in the direction indicated by the arrow A in FIG. 1. The joint bar 116 gripped by the grip member 130 is lifted, displacing the holder rod 38 and the return rods 114a, 114b upwardly. The helical springs 122a, 122b are then compressed.

Then, with the handle lever 126 remaining turned, the outer member 12 is placed on the support 34 such that the tubular member 20 covers the support 34, as shown in FIG. 2. At this time, as shown in FIG. 4, which is a cross-sectional view taken along line IV-IV of FIG. 3, the balls 40a through 40c of the support 34 are inserted in the three ball grooves 22a, 22c, 22e of the six ball grooves 22a through 22f. When the perpendicular line drawn from the centers of the balls 40a through 40c inserted in the ball grooves 22a, 22c, 22e to the central line L (see FIG. 8) of the outer member 12 intersects with the central line L at the point C, the balls 40a through 40c are locked against further insertion into the ball grooves 22a, 22c, 22e. The outer member 12 is then stopped.

As can be seen from the foregoing, the reference outer member 12 is selected such that the balls 40a through 40c will be stopped at the position where AC and BC shown in FIG. 8 are equal to each other.

After the balls 40a through 40c are fitted in the ball grooves 22a, 22c, 22e, the handle lever 126 is released. The helical springs 122a, 122b are extended to resiliently bias the large-diameter disks 120a, 120b of the return rods 114a, 114b downwardly in FIG. 1. As the handle lever 126 is turned in the direction indicated by the arrow B, the return rods 114a, 114b and the holder rod 38 joined to the return rods 114a, 114b by the joint bar 116 are displaced downwardly. The conical point 118 of the holder rod 38 is finally inserted into a cavity 136 defined in the distal end surface of the shank 18 of the outer member 12, holding the outer member 12 in an inverted attitude (see FIG. 2).

Stated otherwise, the reference outer member 12 is fixed in position at the time balls 40a through 40c are inserted to the same position as the rolling balls 16.

Figure 3:
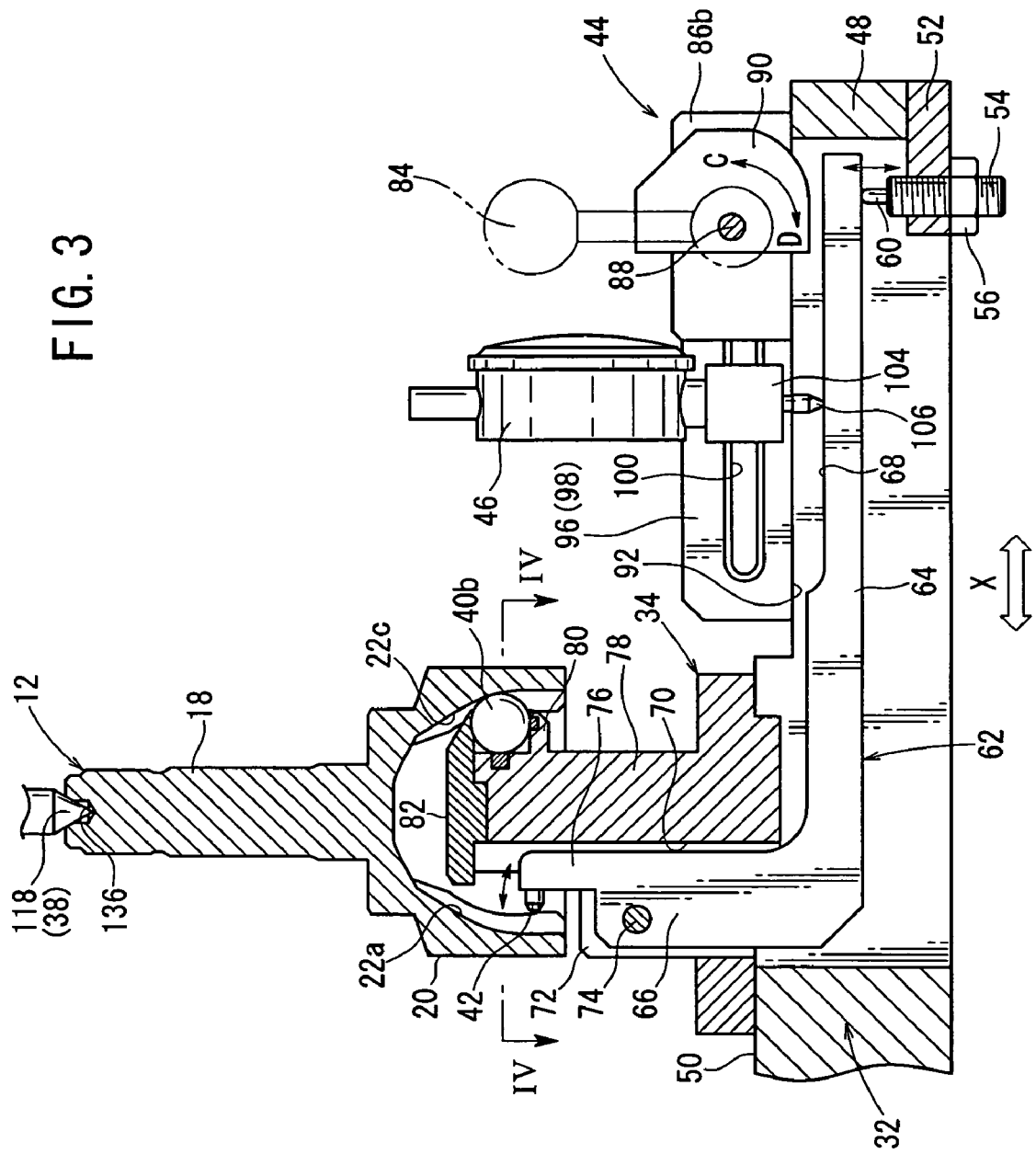
FIG. 3 is a fragmentary vertical cross-sectional view showing the manner in which a lever is turned to displace a measuring probe toward an inner wall surface of a tubular member in the apparatus for measuring a dimension of a constant velocity universal joint shown in FIG. 1.
Figure 4:
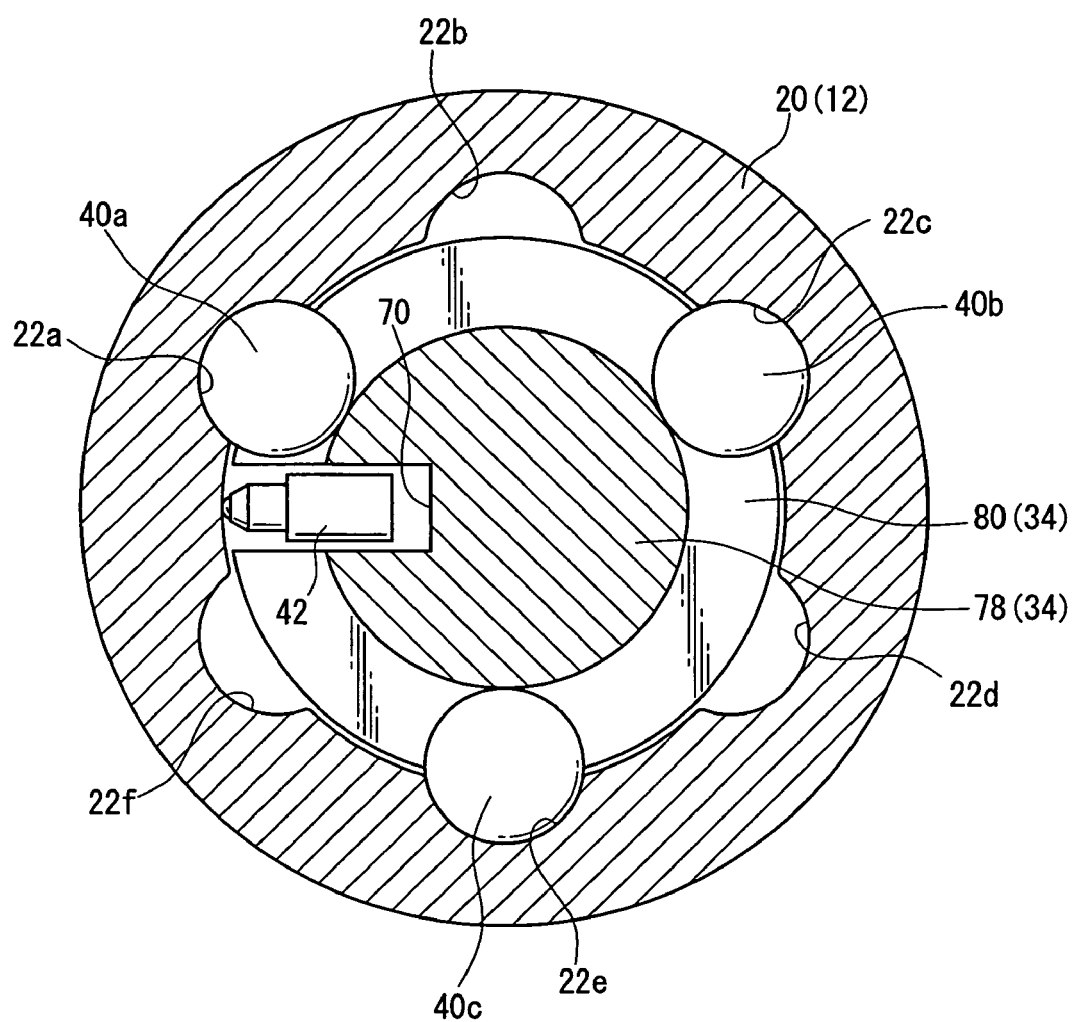
FIG. 4 is a cross-sectional view taken along line IV-IV of FIG. 3.

Then, as shown in FIG. 3, when the lever 84 is turned in the direction indicated by the arrow C, the curved pressing surface of the rotary presser 90 is spaced from the step 68 of the turning member 62. The turning member 62 is then freed from the pressing force of the rotary presser 90, and the presser pin 60 is resiliently biased by the helical spring housed in the screw 54. Accordingly, the presser pin 60 projects upwardly in FIG. 2, pressing the lower end surface of the step 68 of the turning member 62.

When the turning member 62 is thus pressed, the vertical arm 66 is turned about the screw 74, by which the vertical arm 66 is pivotally supported, toward the inner wall surface of the tubular member 20. At the same time, the measuring core 106 of the microgage 46 is pressed by the step 68 and displaced upwardly. The amount of displacement of the measuring core 106 is indicated as a pointer position change by the microgage 46.

As shown in FIG. 4, the tip end of the measuring probe 42 finally abuts against the inner wall surface of the tubular member 20, whereupon the turning movement of the turning member 62 and hence the upward displacement of the measuring core 106 are finished. The pointer of the microgage 46 indicates the amount of displacement of the measuring core 106 up to this time.

The microgage 46 is then operated for zero point adjustment to use the amount of displacement as a reference for measuring an offset of another outer member. Specifically, the dial of the microgage 46 is turned to set the present pointer position as the origin.

After the amount of displacement of the measuring probe 42 which corresponds to the offset of the reference outer member 12 has thus been measured as the amount of displacement of the measuring core 106 of the microgage 46, the lever 84 is turned in the direction indicated by the arrow D (see FIGS. 1, 2, and 3). The rotary presser 90 presses the step 68 again, turning the vertical arm 66 of the turning member 62 and the measuring probe 42 about the screw 74 in a direction away from the inner wall surface of the tubular member 20.

The presser pin 60 is pressed by the lower end surface of the horizontal arm 64 of the turning member 62 into the screw 74, compressing the helical spring therein. The measuring core 106 is displaced downwardly to its original position, and the pointer of the microgage 46 is displaced to its original position. Since the position of the displaced pointer has been corrected as the zero point, the pointer as it is displaced to its original position points at a negative value on the dial.

Thereafter, the handle lever 126 is turned in the direction indicated by the arrow A in FIG. 1. The joint bar 116 is lifted in the same manner as described above, and the holder rod 38 and the return rods 114a, 114b are displaced upwardly. The reference outer member 12 is then released.

Then, an outer member with an unknown offset is positioned on and fixed to the outer member dimension measuring apparatus 30 according to the same procedure as described above, and the measuring probe 42 is brought into abutment against the inner wall surface of the tubular member 20 of the outer member (see FIG. 4). When the measuring probe 42 is thus displaced, the measuring core 106 of the microgage 46 is displaced and accordingly the pointer thereof is displaced.

If the offset of the outer member is the same as the offset of the reference outer member 12 which has been measured as described above, then the pointer is at the origin. If the offset of the outer member is smaller than the offset of the reference outer member 12, then the pointer points at a negative value. If the offset of the outer member is greater than the offset of the reference outer member 12, then the pointer points at a positive value. If the negative value or the positive value falls within an allowable range corresponding to an offset tolerance range, then the outer member is judged as satisfying a predetermined level of dimensional accuracy and sent to a next process. If the negative value or the positive value is so large that the offset exceeds the tolerance range, then the outer member is judged as not satisfying the predetermined level of dimensional accuracy and rejected at this time.

Since the reference outer member 12 whose offset is of the predetermined value is fixed in place at the position where the balls 40a through 40c are at the same position as the rolling balls 16 and is used as an origin (measuring reference), it is possible to determine, easily through a single simple measuring process, whether the offset of an outer member measured next time is in the tolerance range or not.

According to the first embodiment, as described above, the reference outer member 12 is fixed at the position where the rolling balls 16 are stopped, and the amount of displacement of the measuring probe 42 which corresponds to the offset is determined by bringing the measuring probe 42 into abutment against the inner wall surface of the reference outer member 12. Then, the amount of displacement is compared with the amount of displacement of another outer member to determine whether the amount of displacement of the other outer member falls within the tolerance range or not. According to the first embodiment, therefore, the offset of the outer member can easily be measured by a single simple measuring process, so that the measuring efficiency can be increased.

According to the first embodiment, the measuring probe 42 is displaced by turning the turning member 62. However, any displacing mechanism may be employed insofar as it can move the measuring probe 42 toward and away from the inner wall surface of the outer member 12.

As can be understood from the description of the method of measuring the reference outer member 12, the offset may directly be read from the dial scale of the microgage 46.

A second embodiment of the present invention will be described below.

Figure 5:
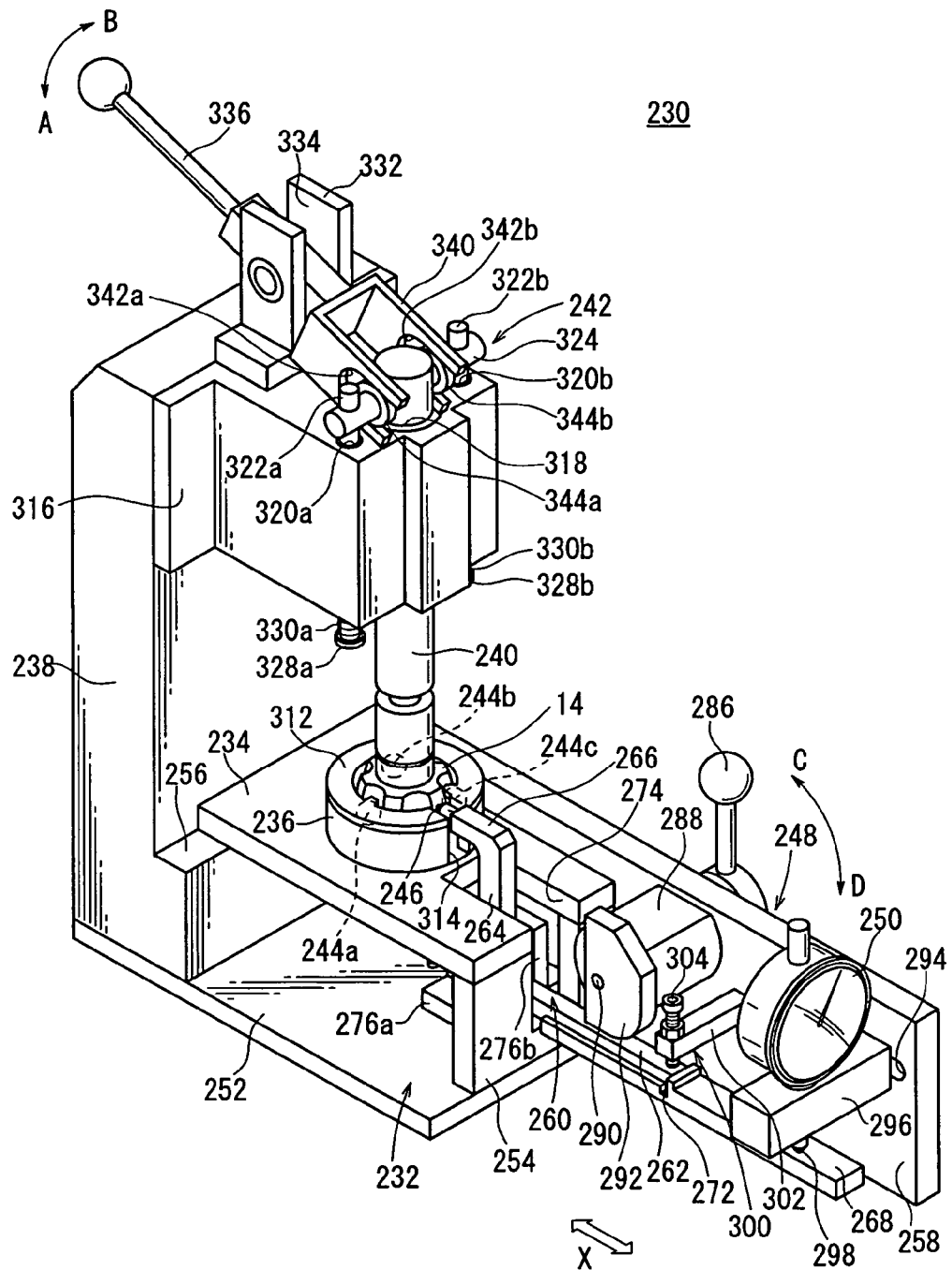
FIG. 5 is a schematic perspective view of an apparatus for measuring a dimension of a constant velocity universal joint according to a second embodiment.
Figure 6:
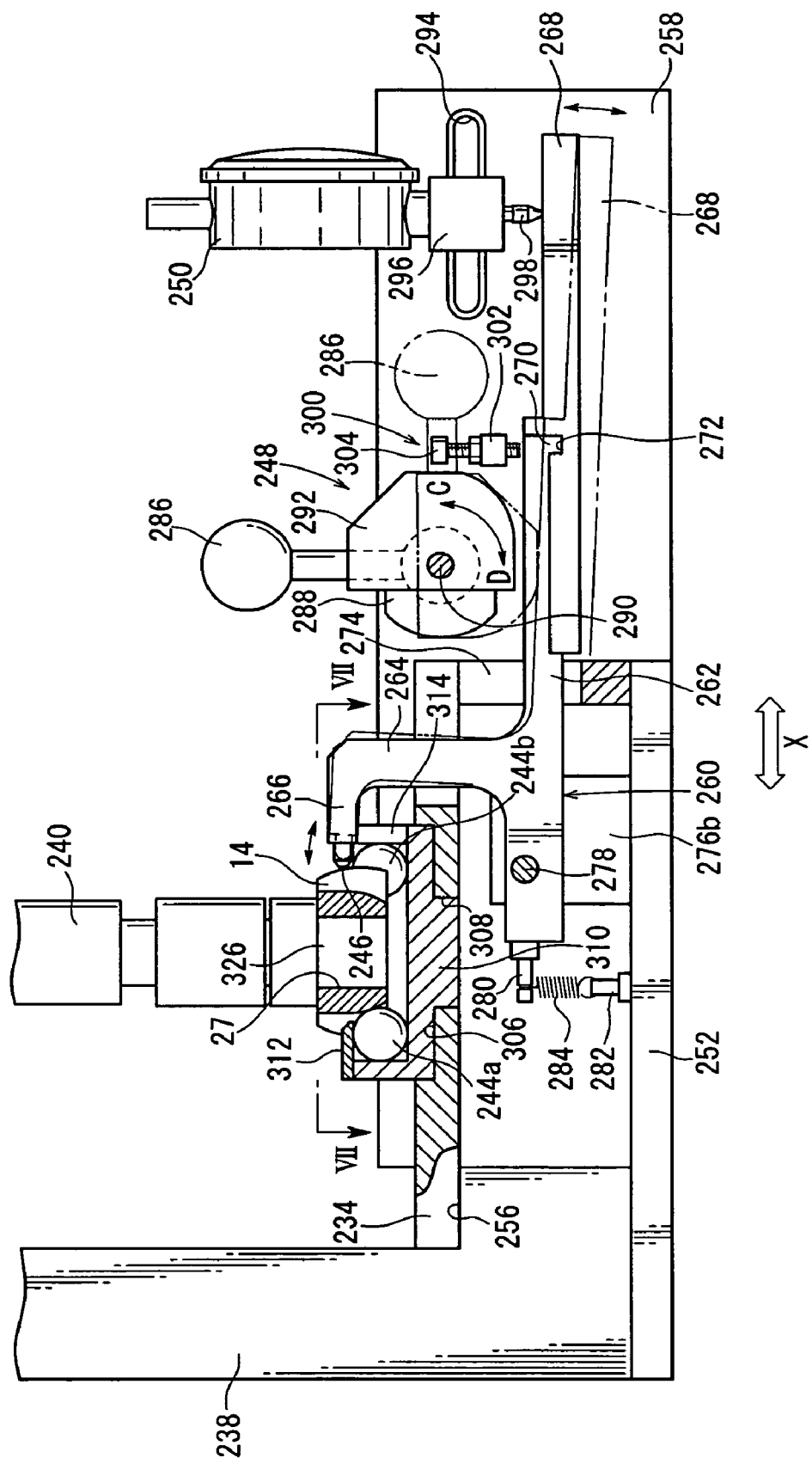
FIG. 6 is a fragmentary vertical cross-sectional view of the apparatus for measuring a dimension of a constant velocity universal joint shown in FIG. 5.

FIG. 5 shows in schematic perspective an apparatus for measuring a dimension of a constant velocity universal joint (hereinafter referred to as "inner member dimension measuring apparatus") according to a second embodiment of the present invention, and FIG. 6 shows the apparatus in fragmentary vertical cross section. The inner member dimension measuring apparatus 230 has a mount 232, a housing 236 placed on a top plate 234 of the mount 232, a holder mechanism 242 having a holder rod 240 disposed above the housing 236 by a post 238, three balls 244a through 244c fixedly positioned in the housing 236, a measuring probe 246 (see FIG. 6) disposed between the balls 244a, 244c, a displacing mechanism 248 for turning the measuring probe 246, and a microgage 250 serving as a displacement indicator for indicating an amount of displacement of the measuring probe 246.

As shown in FIG. 5, the mount 232 has a bottom plate 252, a top plate 234, and a spacer 254 by which the bottom plate 252 and the top plate 234 are spaced from each other. The top plate 234 is placed on and extends from the spacer 254 to a step 256 of the post 238.

A side plate 258 is coupled to sides of the spacer 254 and the top plate 234. The displacing mechanism 248 is supported on the side plate 258.

As shown in FIG. 6, the displacing mechanism 248 has a turning member 260. The turning member 260 has an elongate horizontal arm 262 extending in the direction X in FIGS. 5 and 6, a vertical arm 264 extending vertically upwardly from an end of the horizontal arm 262, and a bent arm 266 formed by bending the distal end portion of the vertical arm 264 and extending toward the housing 236. An extension member 268 is coupled to a lower end surface of the horizontal arm 262. A tooth 270 disposed on the lower end surface of the horizontal arm 262 is fitted in a recess 272 defined in the extension member 268, thereby interconnecting the turning member 260 and the extension member 268.

The spacer 254 and the top plate 234 have a cutout 274 defined therein, and the horizontal arm 262 extends through the cutout 274. The horizontal arm 262 which extends through the cutout 274 is pivotally supported by a pivot pin 278 on L-shaped support plates 276a, 276b that are vertically disposed in confronting relation to each other near the cutout 274.

A first pin 280 having an annular recess defined therein is coupled to the distal end of the horizontal arm 262. A second pin 282 having a through hole defined in a distal end thereof is mounted on the bottom plate 252 below the first pin 280. The first pin 280 and the second pin 282 are engaged by a helical spring 284. The helical spring 284 has opposite ends curved arcuately. One of the ends of the helical spring 284 extends through the through hole in the second pin 282 and the other end engages in the annular recess in the first pin 280. The helical spring 284 normally biases the turning member 260 to move resiliently toward the second pin 282.

The measuring probe 246 is mounted on the distal end surface of the bent arm 266 so as to project toward the post 238.

The displacing mechanism 248 has a lever 286 for angularly moving a shaft 288 extending through a through hole defined in the side plate 258. A rotary presser 292 is positioned on and fixed to the shaft 288 with a joint pin 290. When the lever 286 is turned in the direction indicated by the arrow D, as described later, a curved pressing surface of the rotary presser 292 engages and presses the horizontal arm 262 of the turning member 260. The joint pin 290 is fitted in a through hole defined substantially centrally in the distal end surface of the shaft 288.

The side plate 258 has an oblong hole 294 defined in a distal end portion thereof and extending along the direction indicated by the arrow X. A bolt, not shown, extending through the oblong hole 294 is screwed into a microgage stay 296 in the form of a rectangular parallelepiped. The microgage stay 296 is thus positioned and fixed.

The microgage 250 has a measuring core 298 which is threaded through the microgage stay 296. The tip end of the measuring core 298 which projects from the lower end surface of the microgage stay 296 is held against the upper end surface of the extension member 268.

The microgage 250 has a rotatable dial. Therefore, the marking "0" (origin) on the dial can be set to a desired position.

A stop mechanism 300 has a plate member 302 in the form of a rectangular parallelepiped supported on the side plate 258 between the shaft 288 and the microgage stay 296. A bolt 304 is threaded through the distal end of the plate member 302 and has a tip end extending to a position near the distal end of the horizontal arm 262 of the turning member 260.

The top plate 234 of the mount 232 has a through hole 308 defined therein and having a step 306. The housing 236 has a cylindrical land 310 (see FIG. 6) projecting from the bottom thereof. The cylindrical land 310 is fitted in the through hole 308, thereby securing the housing 236 in position. When the cylindrical land 310 is fitted in the through hole 308, the bottom of the housing 236 is seated on the step 306.

Both the housing 236 exposed on the top plate 234 and a ring member 312 placed on the upper end surface of the housing 236 are substantially annular in shape. The housing 236 and the ring member 312 have a vertical recess 314 defined in sides thereof facing the measuring probe 246 and extending from outer circumferential surfaces to inner circumferential surfaces thereof. The measuring probe 246 extends through the vertical recess 314 and is held against an outer circumferential surface of the inner member 14 which is housed in the housing 236 (see FIG. 7).

The three balls 244a through 244c are fixedly positioned in the housing 236. These balls 244a through 244c are sandwiched between a bottom surface of the housing 236 and a lower end surface of a tongue 313 of the ring member 312 which is slightly wider than the upper end surface of the housing 236.

A joint 316 is connected to the side surface of the post 238 which faces the housing 236 (see FIG. 5). The holder rod 240 is disposed above the housing 236 by the joint 316. The joint 316 has a large through hole 318 and two small through holes 320a, 320b which are juxtaposed in sandwiching relationship to the large through hole 318. The holder rod 240 extends through the large through hole 318, so that the holder rod 240 is positioned above the housing 236. Return rods 322a, 322b extend respectively through the small through holes 320a, 320b. The holder rod 240 and the return rods 322a, 322b are joined to each other by a joint bar 324 extending through and over their heads.

The holder rod 240 has an insert 326 on its lower end which has a diameter corresponding to the diameter of the through hole 27 defined centrally in the inner member 14 (see FIG. 6).

The return rods 322a, 322b (see FIG. 5) have respective large-diameter disks 328a, 328b on their lower ends, and helical springs 330a, 330b have respective ends seated on the large-diameter disks 328a, 328b. The other ends of the helical springs 330a, 330b are seated on a lower end surface of the joint 316 for normally biasing the return rods 322a, 322b resiliently toward the housing 236.

A handle lever support 332 is connected to an upper portion of the joint 316. A handle lever 336 which is inserted through an insertion slot 334 in the handle lever support 332 is angularly movably supported by a pivot shaft 338. A grip member 340 having a substantially C-shaped cross section is mounted on a distal end of the handle lever 336. The grip member 340 has U-shaped grooves 342a, 342b defined in a distal end thereof. The joint bar 324 is fitted in the U-shaped grooves 342a, 342b with spacers 344a, 344b interposed therebetween.

The inner member dimension measuring apparatus 230 according to the second embodiment is basically constructed as described above. Operation and advantages of the inner member dimension measuring apparatus 230 will be described below in relation to a dimension measuring method.

An inner member 14 of a Barfield-type constant velocity universal joint 10 whose offset is of a predetermined value is prepared, and used as a measurement reference (the inner member will be hereinafter referred to as "reference inner member").

Figure 7:
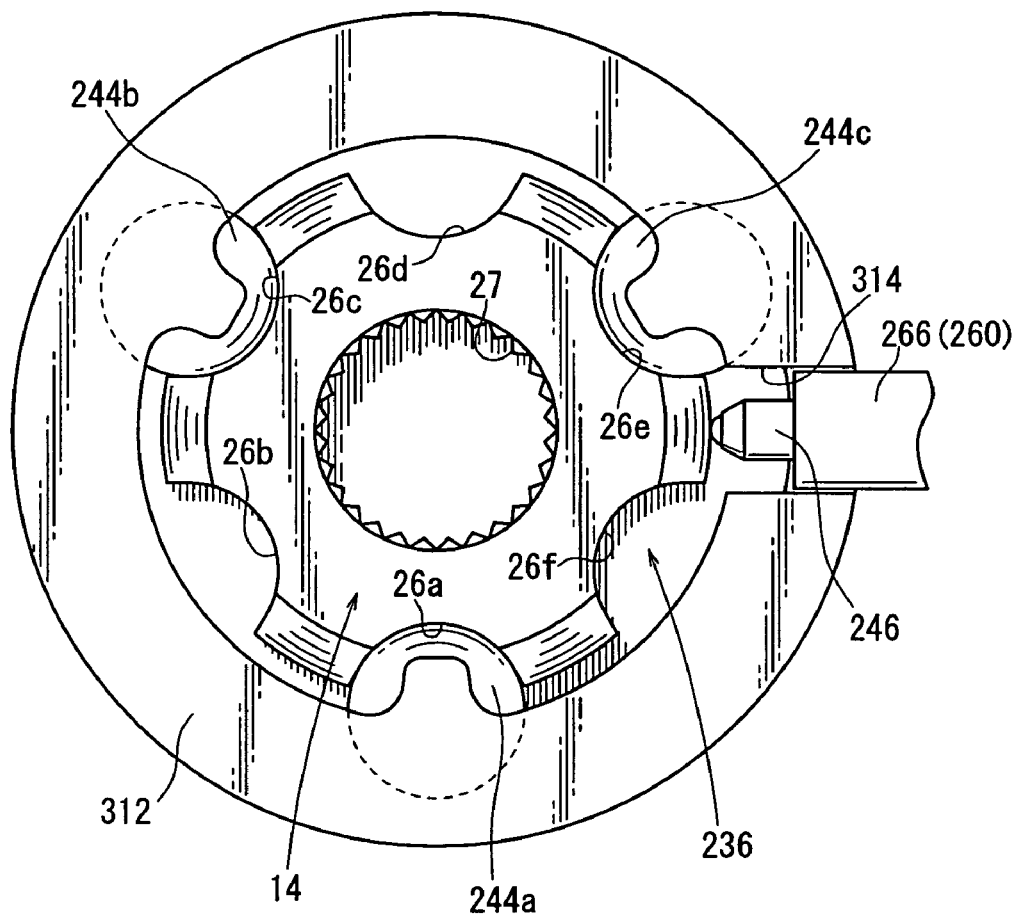
FIG. 7 is a cross-sectional view taken along line VII-VII of FIG. 6, showing the manner in which a lever is turned to displace a measuring probe toward an inner wall surface of a tubular member in the apparatus for measuring a dimension of a constant velocity universal joint shown in FIG. 5.

As shown in FIG. 7, the inner member 14 has as many inner ball grooves 26a through 26f as the number of ball grooves 22a through 22f in the outer member 12, the inner ball grooves 26a through 26f being defined in a convexly curved outer circumferential surface of the inner member 14. The inner member 14 also has a through hole 27 defined therein which extends from one end to the other end thereof. For measuring the inner member 14 on the inner member dimension measuring apparatus 230, the lever 286 is held in a two-dot-and-dash-line position shown in FIG. 6, and the handle lever 336 is turned in the direction indicated by the arrow A in FIG. 5. The joint bar 324 gripped by the grip member 340 is lifted, displacing the holder rod 240 and the return rods 322a, 322b upwardly. The helical springs 330a, 330b are then compressed.

Then, with the handle lever 336 remaining turned, the inner member 14 is placed in the housing 236, as shown in FIG. 6. At this time, as shown in FIG. 7, which is a cross-sectional view taken along line VII-VII of FIG. 6, the balls 244a through 244c of the housing 236 are inserted into the three inner ball grooves 26a, 26c, 26e of the six inner ball grooves 26a through 26f. When the perpendicular line drawn from the centers of the balls 244a through 244c inserted in the inner ball grooves 26a, 26c, 26e to the central line L (see FIG. 8) of the inner member 14 intersects with the central line L at the point C, the balls 244a through 244c are locked against further insertion into the ball grooves 26a, 26c, 26e. The inner member 14 is then positioned.

As can be seen from the foregoing, the reference inner member 14 is selected such that the balls 244a through 244c will be stopped at the position where AC and BC shown in FIG. 8 are equal to each other.

After the balls 244a through 244c are fitted in the ball grooves 26a, 26c, 26e (see FIG. 7), the handle lever 336 is released. The helical springs 330a, 330b are expanded to resiliently bias the large-diameter disks 328a, 328b of the return rods 322a, 322b downwardly in FIG. 5. As the handle lever 336 is turned in the direction indicated by the arrow B, the return rods 322a, 322b and the holder rod 240 joined to the return rods 322a, 322b by the joint bar 324 are displaced downwardly. The insert 326 of the holder rod 240 is finally inserted into the through hole 27 in the inner member 14, reliably holding the inner member 14 (see FIG. 6).

Stated otherwise, the reference inner member 14 is fixed in position at the time the balls 244a through 244c are inserted to the same position as the rolling balls 16.

Then, as shown in FIG. 6, when the lever 286 is turned in the direction indicated by the arrow C to vertically stand, the curved pressing surface of the rotary presser 292 is spaced from the horizontal arm 262 of the turning member 260. The turning member 260 is then freed from the pressing force of the rotary presser 292, and as the helical spring 284 is compressed, the horizontal arm 262 of the turning member 260 is displaced toward the bottom plate 252. As a result, the turning member 260 is angularly moved about the pivot pin 278 toward the inner member 14 housed in the housing 236. At the same time, the measuring core 298 of the microgage 250 is pressed and displaced upwardly by the extension member 268. The amount of displacement is indicated as a pointer position change by the microgage 250.

When the turning member 260 is angularly moved excessively, the horizontal arm 262 of the turning member 260 abuts against the bolt 304 of the stop mechanism 300. The turning member 260 is then prevented from being further angularly moved.

As shown in FIG. 7, the tip end of the measuring probe 246 finally abuts against the curved outer circumferential surface of the inner member 14, whereupon the turning movement of the turning member 260 and hence the upward displacement of the measuring core 298 are finished. The pointer of the microgage 250 indicates the amount of displacement of the measuring core 298 up to this time.

The microgage 250 is then operated for zero point adjustment to use the amount of displacement as a reference for measuring an offset of another inner member. Specifically, the dial of the microgage 250 is turned to set the present pointer position as the origin.

After the amount of displacement of the measuring probe 246 which corresponds to the offset of the reference inner member 14 has thus been measured as the amount of displacement of the measuring core 298 of the microgage 250, the lever 286 is turned in the direction indicated by the arrow D (see FIGS. 5 and 6). The rotary presser 292 presses the horizontal arm 262 of the turning member 260 again, turning the turning member 260 about the pivot pin 278. The measuring probe 246 is spaced away from the outer circumferential surface of the reference inner member 14. At this time, the helical spring 284 is extended.

The measuring core 298 is displaced downwardly to its original position, and the pointer of the microgage 250 is displaced to its original position. Since the position of the displaced pointer has been corrected as the zero point, the pointer as it is displaced to its original position points at a negative value on the dial.

Thereafter, the handle lever 336 is turned in the direction indicated by the arrow A in FIG. 5. The joint bar 324 is lifted in the same manner as described above, and the holder rod 240 and the return rods 322a, 322b are displaced upwardly. The reference inner member 14 is then released.

Then, an inner member with an unknown offset is positioned on and fixed to the housing 236 of the inner member dimension measuring apparatus 230 according to the same procedure as described above, and the measuring probe 246 is brought into abutment against the outer circumferential surface of the inner member (see FIG. 7).

When the measuring probe 246 is thus displaced, the measuring core 298 of the microgage 250 is displaced and finally the pointer thereof is displaced.

If the offset of the inner member is the same as the offset of the reference inner member 14 which has been measured as described above, then the pointer is at the origin. If the offset of the inner member is smaller than the offset of the reference inner member 14, then the pointer points at a negative value. If the offset of the inner member is greater than the offset of the reference inner member 14, then the pointer points at a positive value. If the negative value or the positive value falls within an allowable range corresponding to an offset tolerance range, then the inner member is judged as satisfying a predetermined level of dimensional accuracy and sent to a next process. If the negative value or the positive value is so large that the offset exceeds the tolerance range, then the inner member is judged as not satisfying the predetermined level of dimensional accuracy and rejected at this time.

Since the reference inner member 14 whose offset is of the predetermined value is fixed in place at the position where the balls 244a through 244c are at the same position as the rolling balls 16 and is used as an origin (measuring reference), it is possible to determine, easily through a single simple measuring process, whether the offset of an inner member measured next time is in the tolerance range or not.

According to the second embodiment, as described above, the reference inner member 14 is fixed at the position where the rolling balls 16 are stopped, and the amount of displacement of the measuring probe 246 which corresponds to the offset is determined by bringing the measuring probe 246 into abutment against the outer circumferential surface of the reference inner member 14. Then, the amount of displacement is compared with the amount of displacement of another inner member to determine whether the amount of displacement of the other inner member falls within the tolerance range or not. According to the second embodiment, therefore, the offset of the inner member can easily be measured by a single simple measuring process, so that the measuring efficiency can be increased.

According to the second embodiment, the measuring probe 246 is displaced by turning the turning member 260. However, any displacing mechanism may be employed insofar as it can move the measuring probe 246 toward and away from the outer circumferential surface of the inner member 14.

As can be understood from the description of the method of measuring the reference inner member 14, the offset may directly be read from the dial scale of the microgage 250.

An object to be measured for an offset is not limited to an outer member or an inner member of a Barfield-type constant velocity universal joint, but may be an outer member or an inner member of a double-offset constant velocity universal joint (DOJ).

The invention claimed is:

1. A method of measuring a dimension of a constant velocity universal joint to measure the distance from the center of a spherical inner surface of an outer member of the constant velocity universal joint to the center of ball grooves thereof, comprising the steps of:

supporting an outer member as a measurement reference whose distance from the center of the spherical inner surface to the center of the ball grooves has been measured in advance, and inserting balls into some of the ball grooves defined in an inner wall surface of an open tubular member of said outer member;

causing a measuring probe disposed between the balls to project into abutment against the inner wall surface of said tubular member, and using the amount of displacement of said measuring probe until said measuring probe abuts against the inner wall surface of said tubular member, as a reference amount of displacement;

supporting an outer member to be measured and inserting the balls into some of the ball grooves defined in the inner wall surface of the tubular member of said outer member;

causing said measuring probe to project into abutment against the inner wall surface of said tubular member; and calculating the difference between the amount of displacement of said measuring probe until said measuring probe abuts against the inner wall surface of said tubular member and said reference amount of displacement.

2. A method according to claim 1, further comprising the step of:
if the difference between the amount of displacement of said measuring probe and said reference amount of displacement falls within a preset range, judging that said outer member has a level of dimensional accuracy in an allowable range.

3. An apparatus for measuring a dimension of a constant velocity universal joint to measure the distance from the center of a spherical inner surface of an outer member of the constant velocity universal joint to the center of ball grooves thereof, comprising:
a base;
a support vertically mounted on said base and supporting an open tubular member of said outer member;
a holder disposed above said support and holding a shank of said outer member;
a plurality of balls positioned on and fixed to a distal end of said support and inserted individually into a plurality of ball grooves defined in an inner wall surface of said tubular member, the number of said balls being smaller than the number of said ball grooves;
a measuring probe disposed between said balls and movable into and out of abutment against the inner wall surface of said tubular member;
a displacing mechanism for moving said measuring probe into and out of abutment against the inner wall surface of said tubular member; and
a displacement indicator for indicating the amount of displacement of said measuring probe until said measuring probe is brought into abutment against the inner wall surface of said tubular member.

4. An apparatus according to claim 3, wherein said measuring probe is moved toward the inner wall surface of said tubular member when a turning member having an end to which said measuring probe is fixed is turned by a presser which presses another end of said turning member, and said measuring probe is moved away from the inner wall surface of said tubular member when the other end of said turning member is freed from a pressing force of said presser.

5. A method of measuring a dimension of a constant velocity universal joint, which has an outer member and an inner member mounted therein, to measure the distance from the center of a spherical inner surface of the inner member to the center of inner ball grooves thereof, comprising the steps of:
supporting an inner member as a measurement reference whose distance from the center of the spherical inner surface to the center of the inner ball grooves has been measured in advance, and inserting balls into some of inner ball grooves defined in the inner member;
causing a measuring probe disposed between the balls to project into abutment against an outer circumferential surface of said inner member between said inner ball grooves, and using the amount of displacement of said measuring probe until said measuring probe abuts against said outer circumferential surface, as a reference amount of displacement;
supporting an inner member to be measured and inserting the balls into some of the ball grooves defined in said inner member;
displacing said measuring probe into abutment against said outer circumferential surface; and
calculating the difference between the amount of displacement of said measuring probe until said measuring probe abuts against said outer circumferential surface and said reference amount of displacement.

6. A method according to claim 5, further comprising the step of:
if the difference between the amount of displacement of said measuring probe and said reference amount of displacement falls within a preset range, judging that said inner member has a level of dimensional accuracy in an allowable range.

7. An apparatus for measuring a dimension of a constant velocity universal joint to measure the distance from the center of a spherical inner surface of an inner member of the constant velocity universal joint to the center of inner ball grooves thereof, comprising:
a mount;
a housing mounted on said mount and housing said inner member;
a holder mechanism disposed above said housing and having a holder rod including a portion to extend through a through hole in said inner member;
a plurality of balls disposed in said housing and inserted individually into a plurality of inner ball grooves defined in said inner member;
a measuring probe disposed between said balls and movable into and out of abutment against an outer circumferential surface of said inner member;
a displacing mechanism for moving said measuring probe into and out of abutment against the outer circumferential surface of said inner member; and
a displacement indicator for indicating the amount of displacement of said measuring probe until said measuring probe is brought into abutment against the outer circumferential surface of said inner member.

8. An apparatus according to claim 7, wherein said measuring probe is moved away from said outer circumferential surface when a turning member having an end to which said measuring probe is fixed is turned by a presser which presses another end of said turning member, and said measuring probe is moved toward said outer circumferential surface when the other end of said turning member is freed from a pressing force of said presser.

* * * * *